US 10,773,872 B2

(12) United States Patent
Kagramanyan

(10) Patent No.: US 10,773,872 B2
(45) Date of Patent: Sep. 15, 2020

(54) APPARATUSES AND METHODS FOR CONTAINER CONTENT PRESERVATION

(71) Applicant: Norik Kagramanyan, Pacoima, CA (US)

(72) Inventor: Norik Kagramanyan, Pacoima, CA (US)

( * ) Notice: Subject to any disclaimer, the term of this patent is extended or adjusted under 35 U.S.C. 154(b) by 280 days.

(21) Appl. No.: 15/727,558

(22) Filed: Oct. 6, 2017

(65) Prior Publication Data

US 2018/0099803 A1 Apr. 12, 2018

Related U.S. Application Data

(60) Provisional application No. 62/404,764, filed on Oct. 6, 2016.

(51) Int. Cl.
*B65D 81/20* (2006.01)
*B67B 7/04* (2006.01)
*B65B 31/04* (2006.01)

(52) U.S. Cl.
CPC ........ *B65D 81/2015* (2013.01); *B65B 31/046* (2013.01); *B65D 81/2007* (2013.01); *B67B 7/0405* (2013.01)

(58) Field of Classification Search
CPC ............... B65D 81/20; B65D 81/2007; B65D 81/2015; B65B 31/04; B65B 31/041; B67B 7/0405
USPC ......... 99/472, 277.1; 53/432, 510; 141/8, 65
See application file for complete search history.

(56) References Cited

U.S. PATENT DOCUMENTS

| | | | |
|---|---|---|---|
| 2,436,849 A | | 3/1948 | Billetter |
| 2,457,867 A | * | 1/1949 | Chambers ................. B67B 3/24 53/79 |
| 3,452,510 A | | 7/1969 | Fry |
| 3,602,387 A | | 8/1971 | Patnaude |
| 4,889,250 A | | 12/1989 | Beyer |

(Continued)

FOREIGN PATENT DOCUMENTS

| | | |
|---|---|---|
| DE | 202004016080 U1 | 5/2005 |
| EP | 0272736 A1 | 6/1988 |

(Continued)

OTHER PUBLICATIONS

PCT/US2018/026264. International Search Report & Written Opinion (dated Sep. 24, 2018).

*Primary Examiner* — Reginald Alexander
(74) *Attorney, Agent, or Firm* — Loza & Loza, LLP; Sevan Savsa

(57) ABSTRACT

One feature pertains to a device that includes a main body having a bottle-receiving end that receives a bottle and forms a substantially airtight seal between the main body and an exterior surface of the bottle surrounding a mouth of the bottle. The bottle-receiving end has a bottom opening to allow for fluid-flow communication between an interior air cavity of the main body and a headspace of the bottle. The device further includes a stopper securement device, and a vacuum pump that evacuates air out of the interior air cavity and the headspace to create a vacuum or partial vacuum within the headspace. The device also includes a means for inserting the stopper into the mouth of the bottle using the stopper securement device after the vacuum pump evacuates air out of the interior cavity and the headspace.

20 Claims, 18 Drawing Sheets

(56) References Cited

U.S. PATENT DOCUMENTS

| | | | |
|---|---|---|---|
| 5,339,595 A * | 8/1994 | Rouse | B65B 7/2821 |
| | | | 53/320 |
| 5,535,900 A | 7/1996 | Huang | |
| 6,250,343 B1 | 6/2001 | Chen | |
| 6,637,321 B2 | 10/2003 | Wang | |
| 6,935,524 B2 | 8/2005 | Wilhite | |
| 7,086,427 B2 | 8/2006 | Bonich | |
| 7,255,022 B1 | 8/2007 | Rivera | |
| 7,562,794 B2 | 7/2009 | Van De Braak et al. | |
| 7,726,356 B2 | 6/2010 | Van Der Lande | |
| 7,743,796 B1 * | 6/2010 | Schooley | B65D 39/0052 |
| | | | 141/351 |
| 8,783,486 B1 | 7/2014 | Hoyt et al. | |
| 8,919,610 B2 | 12/2014 | Haley et al. | |
| 2003/0136091 A1 * | 7/2003 | Takahashi | B65B 31/02 |
| | | | 53/510 |
| 2004/0232101 A1 * | 11/2004 | Gardner | B65D 1/0246 |
| | | | 215/277 |
| 2005/0016129 A1 | 1/2005 | Yoshida et al. | |
| 2008/0142470 A1 | 6/2008 | Van Der Lande | |
| 2009/0001041 A1 | 1/2009 | Belcastro | |
| 2010/0155419 A1 * | 6/2010 | Nishino | B67D 1/04 |
| | | | 222/81 |
| 2011/0220606 A1 | 9/2011 | Alipour | |
| 2016/0136048 A1 | 5/2016 | Marantis et al. | |

FOREIGN PATENT DOCUMENTS

| | | |
|---|---|---|
| FR | 2394452 A1 | 1/1979 |
| FR | 2650816 A1 | 2/1991 |

\* cited by examiner

```
2100 ─┐
```

┌─────────────────────────────────────────────────────────────┐  2102
│ Insert a mouth of a bottle into a bottom opening of a bottle-receiving │
│ end of a device to form a substantially airtight seal between the bottle- │
│ receiving end of the device and an exterior surface of the bottle │
│ surrounding the mouth of the bottle. │
└─────────────────────────────────────────────────────────────┘
                              │
                              ▼
┌─────────────────────────────────────────────────────────────┐  2104
│ Provide fluid-flow communication between an interior air cavity of the │
│ device and a headspace of the bottle through the bottom opening. │
└─────────────────────────────────────────────────────────────┘
                              │
                              ▼
┌─────────────────────────────────────────────────────────────┐  2106
│ Extend a corkscrew within the device toward the bottom opening of the │
│ bottle-receiving end to secure to a stopper within a neck of the bottle. │
└─────────────────────────────────────────────────────────────┘
                              │
                              ▼
┌─────────────────────────────────────────────────────────────┐  2108
│ Retract the corkscrew to remove the stopper from the neck of the bottle. │
└─────────────────────────────────────────────────────────────┘
                              │
                              ▼
┌─────────────────────────────────────────────────────────────┐  2110
│ Store the stopper within the interior air cavity of the device. │
└─────────────────────────────────────────────────────────────┘
                              │
                              ▼
┌─────────────────────────────────────────────────────────────┐  2112
│ Evacuate air out from the interior air cavity of the device and the │
│ headspace of the bottle to create a vacuum or partial vacuum within the │
│ headspace. │
└─────────────────────────────────────────────────────────────┘
                              │
                              ▼
┌─────────────────────────────────────────────────────────────┐  2114
│ Extend the corkscrew with the stopper secured thereto toward the │
│ mouth of the bottle and inserting the stopper into the neck of the bottle │
│ while the headspace of the bottle is under vacuum or partial vacuum. │
└─────────────────────────────────────────────────────────────┘

*FIG. 21*

APPARATUSES AND METHODS FOR CONTAINER CONTENT PRESERVATION

CLAIM OF PRIORITY

The present application for patent claims priority to provisional application No. 62/404,764 entitled "APPARATUS AND METHOD FOR EVACUATING A BOTTLE AND SECURING A STOPPER WITHIN" filed Oct. 6, 2016, the entire disclosure of which is hereby expressly incorporated by reference.

BACKGROUND

Field

Various features relate to devices that create at least a partial vacuum within the headspace of a bottle prior to resealing the bottle. In particular, features relate to handheld devices that may open bottles having stoppers, such as wine bottles, and resealing such bottles under vacuum using the bottle's original stopper.

Background

Bottles containing fermented beverages, such as wine, are typically sealed with a cork stopper made of natural or synthetic materials. The cork is lodged within the neck of the bottle and prevents the bottle's contents from being exposed to air. The cork may be removed using a traditional corkscrew or other various tools and techniques.

Once the cork is removed, the wine is exposed to oxygen in the air and becomes susceptible to oxidation. Prolonged exposure to oxygen can detrimentally affect the quality and flavor of the wine. Thus, wine that remains in a partially consumed bottle can quickly deteriorate in smell and taste even if the bottle is re-corked. This occurs because oxygen that entered the bottle when the cork was removed remains in the headspace of the bottle after re-corking.

In an effort to preserve partially consumed wine, various vacuum sealers have been developed to remove air from the headspace of a bottle after re-corking so as to minimize oxidation of the wine. One such example is presented in U.S. Pat. No. 5,535,900. This conventional vacuum sealer, and other devices like it, utilize a hand pump working in conjunction with a specially designed stopper fitted with a one-way valve to evacuate air from the bottle. These systems have multiple and significant disadvantages. First, they are cumbersome and may be costly because they are two piece systems that require the use of device-specific stoppers that can only work with their corresponding vacuum pump device. Second, the number of device-specific stoppers a user has in their possession limits the number of bottles they can reseal. Sealing many bottles may require the user to order additional device-specific stoppers at additional cost. Third, such one-way valve stoppers have been known to work poorly because they are prone to air leakage.

Other common types of vacuum sealers are those that combine a vacuum pump and a stopper into one device. An example of one such pump and stopper combination is presented in U.S. Pat. No. 6,637,321. This conventional vacuum sealer, and other like it, are problematic because the entire device, including the pump, remains fixed atop the bottle. Thus, a user needing to preserve multiple bottles at the same time is forced to acquire a separate device for each bottle they wish to preserve.

All of the aforementioned systems also fail to provide any means for opening an unopened bottle. They are only meant to offer limited attempts to preserve the bottle's contents under vacuum. Thus, a user must also purchase and store a separate bottle opener, which can be cumbersome.

Therefore, there is a need for apparatuses that can both open bottles/containers and also preserve their contents under vacuum. There is also a need for apparatuses that reseal such bottles/containers without requiring device-specific, complex stoppers and allow a user to reseal many bottles without requiring additional parts or devices.

SUMMARY

One feature provides an apparatus comprising a main body having a bottle-receiving end that is adapted to receive a bottle and form a substantially airtight seal between the main body and an exterior surface of the bottle surrounding a mouth of the bottle, the bottle-receiving end having a bottom opening to allow for fluid-flow communication between an interior air cavity of the main body and a headspace of the bottle, a stopper securement device, a vacuum pump adapted to evacuate air out of the interior air cavity and the headspace to create a vacuum or partial vacuum within the headspace, and means for inserting the stopper into the mouth of the bottle using the stopper securement device after the vacuum pump evacuates air out of the interior cavity and the headspace, thereby sealing the bottle with the headspace of the bottle under vacuum or partial vacuum. According to one aspect, the apparatus further comprises a means for removing the stopper from a neck of the bottle using the stopper securement device, the means for removing the stopper adapted to remove the stopper prior to the vacuum pump evacuating air out of the interior air cavity and the headspace. According to another aspect, the means for inserting the stopper into the mouth of the bottle and the means for removing the stopper from the neck of the bottle is an actuator assembly that includes an electric motor powered by a battery.

According to one aspect, the apparatus further comprises an input interface coupled to the main body, the input interface including at least one button that is adapted to instruct the actuator assembly to move the stopper securement device. According to another aspect, the bottle-receiving end includes an elastic bottom surface adapted to form a substantially airtight seal between the main body and the exterior surface of the bottle surrounding the mouth of the bottle. According to yet another aspect, the bottle-receiving end includes a foam ring adapted to form a substantially airtight seal between the main body and the exterior surface of the bottle surrounding the mouth of the bottle.

According to one aspect, the vacuum pump includes an inlet within the interior air cavity of the main body to evacuate air from the interior air cavity and an outlet at or near an exterior service of the main body to eject the air evacuated outside the apparatus. According to another aspect, the main body includes an upper portion, and a lower portion, wherein the upper portion and lower portion have different diameters and are slideably coupled to each other allowing one to retract into the other, the lower portion including the bottle-receiving end having the bottom opening. According to yet another aspect, the upper portion and the lower portion are adapted to move relative to each other so that the upper portion lowers the stopper down into the mouth of the bottle after the vacuum pump evacuates air out of the interior cavity and the headspace. According to another aspect, the apparatus further comprises a locking mechanism coupled to the main body, the locking mechanism adapted to prevent the upper portion and the lower portion from moving with respect to each other when engaged.

Another feature provides an apparatus comprising a housing having a bottle-receiving end that is adapted to receive a bottle and form a substantially airtight seal between the housing and an exterior surface of the bottle surrounding a mouth of the bottle, the bottle-receiving end having a bottom opening to allow for fluid-flow communication between an interior air cavity of the housing and a headspace of the bottle, an actuator assembly operatively coupled to a stopper securement device, the actuator assembly adapted to move the stopper securement device to secure to a stopper and remove the stopper from the mouth of the bottle, and a vacuum pump adapted to evacuate air out of the interior air cavity and the headspace after the stopper has been removed to create a vacuum or partial vacuum within the headspace, wherein the actuator assembly is further adapted to move the stopper securement device and the stopper secured thereto in order to insert the stopper into the mouth of the bottle. According to one aspect, the actuator assembly is further adapted to extend the stopper securement device toward the bottom opening and into the stopper while rotating the stopper securement device. According to another aspect, the actuator assembly is further adapted to retract the stopper securement device with the stopper secured thereto without rotating the stopper securement device. According to yet another aspect, the actuator assembly is further adapted to extend the stopper securement device with the stopper secured thereto toward the bottom opening, and press the stopper into the mouth of the bottle while rotating the stopper securement device.

According to one aspect, the bottle-receiving end includes an elastic bottom surface adapted to form a substantially airtight seal between the housing and the exterior surface of the bottle surrounding the mouth of the bottle. According to another aspect, the bottle-receiving end includes a foam ring adapted to form a substantially airtight seal between the housing and the exterior surface of the bottle surrounding the mouth of the bottle. According to yet another aspect, the apparatus further comprises an air pressure sensor that determines whether the air pressure within the headspace has achieved or exceed a predetermined level of vacuum prior to the actuator assembly inserting the stopper into the mouth of the bottle.

According to one aspect, the vacuum pump is an electronic, battery-operated positive-displacement vacuum pump, and the actuator assembly includes a direct current (DC) electric motor that drives the stopper securement device. According to another aspect, the housing is substantially cylindrical in shape and the apparatus if a handheld, battery-operated device.

Another feature provides a method comprising inserting a mouth of a bottle into a bottom opening of a bottle-receiving end of a device to form a substantially airtight seal between the bottle-receiving end of the device and an exterior surface of the bottle surrounding the mouth of the bottle, providing fluid-flow communication between an interior air cavity of the device and a headspace of the bottle through the bottom opening, extending a corkscrew within the device toward the bottom opening of the bottle-receiving end to secure to a stopper within a neck of the bottle, retracting the corkscrew to remove the stopper from the neck of the bottle, storing the stopper within the interior air cavity of the device, evacuating air out from the interior air cavity of the device and the headspace of the bottle to create a vacuum or partial vacuum within the headspace, and extending the corkscrew with the stopper secured thereto toward the mouth of the bottle and inserting the stopper into the neck of the bottle while the headspace of the bottle is under vacuum or partial vacuum.

BRIEF DESCRIPTION OF THE DRAWINGS

FIG. 21 illustrates a flow diagram of a method.

DETAILED DESCRIPTION

In the following description, specific details are given to provide a thorough understanding of the various aspects (e.g., embodiments) of the disclosure. However, it will be understood by one of ordinary skill in the art that aspects of the disclosure may be practiced without these specific details. The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Figure 1:
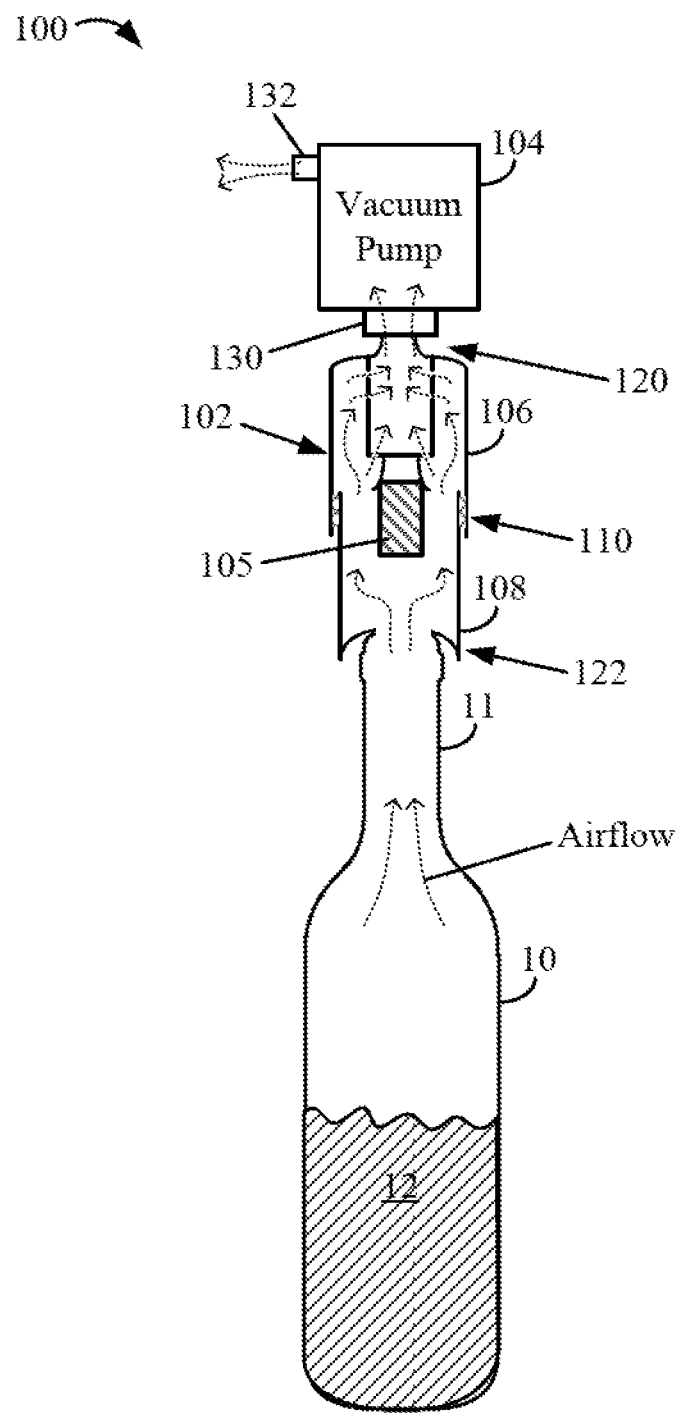
FIG. 1 illustrates a cross-sectional schematic view of a device for evacuating a bottle and securing a stopper within.

FIG. 1 illustrates a cross-sectional schematic view of a device 100 (e.g., apparatus) for evacuating a bottle 10 and securing a stopper within according to one aspect. As just one example the device 100 may be a handheld device used to evacuate air containing oxygen from a wine bottle 10 and secure a stopper (e.g., natural cork, rubber cork, etc.) 105 within the neck 11 of the bottle 10. Evacuating the air within the bottle 10 preserves the contents (e.g., wine) 12 of the bottle 10 longer, which having been previously opened may have been exposed to oxygen. For the sake of clarity the description that follows assumes the device 100 is used to reseal a bottle of wine with a cork. However, in practice the device 100 may be used to evacuate air from any type of bottle containing any type of substance and secure a stopper within an opening of the bottle.

Referring to FIG. 1, the device 100 includes a main body 102 (e.g., housing) that is in fluid communication with a vacuum pump 104. The main body 102 is substantially hollow and, as described in greater detail below, the vacuum pump 104 is used to evacuate the hollow main body 102 and air space within a bottle 10 coupled to the main body 102. The main body 102 includes an upper portion 106 and a lower portion 108 that are slideably coupled to one another at an air tight juncture 110. The upper portion 106 includes a top end (e.g., first end) 120 having an opening that couples to the vacuum pump 104. The lower portion 108 includes a bottom end (e.g., first end) 122 that couples to the top of an open wine bottle 10 to form an airtight seal between the wine bottle 10 and the device 100. The wine bottle 10 is at least partially full of wine 12. A bottom end of the upper portion 106 couples to a top end of the lower portion 108 at the airtight juncture 110.

The vacuum pump 104 may be any vacuum pump known in the art that includes an inlet 130 for sucking out air from the vessel to be evacuated and an outlet 132 to dispel the air sucked out from the vessel. In one aspect, the vacuum pump 104 is a manually (e.g., hand) operated positive displacement pump. In another aspect, the vacuum pump 104 is a battery operated positive displacement pump. Regardless of the specific operative characteristics of the vacuum pump 104 used, the vacuum pump's inlet 130 is coupled to the device's main body 102 and the pump 104 serves to evacuate the air contained within the main body 102 through the opening at the upper portion's top end 120. Since the bottle 10 is in fluid communication with the main body 102, air within the bottle 10 itself is also evacuated.

Figure 2:
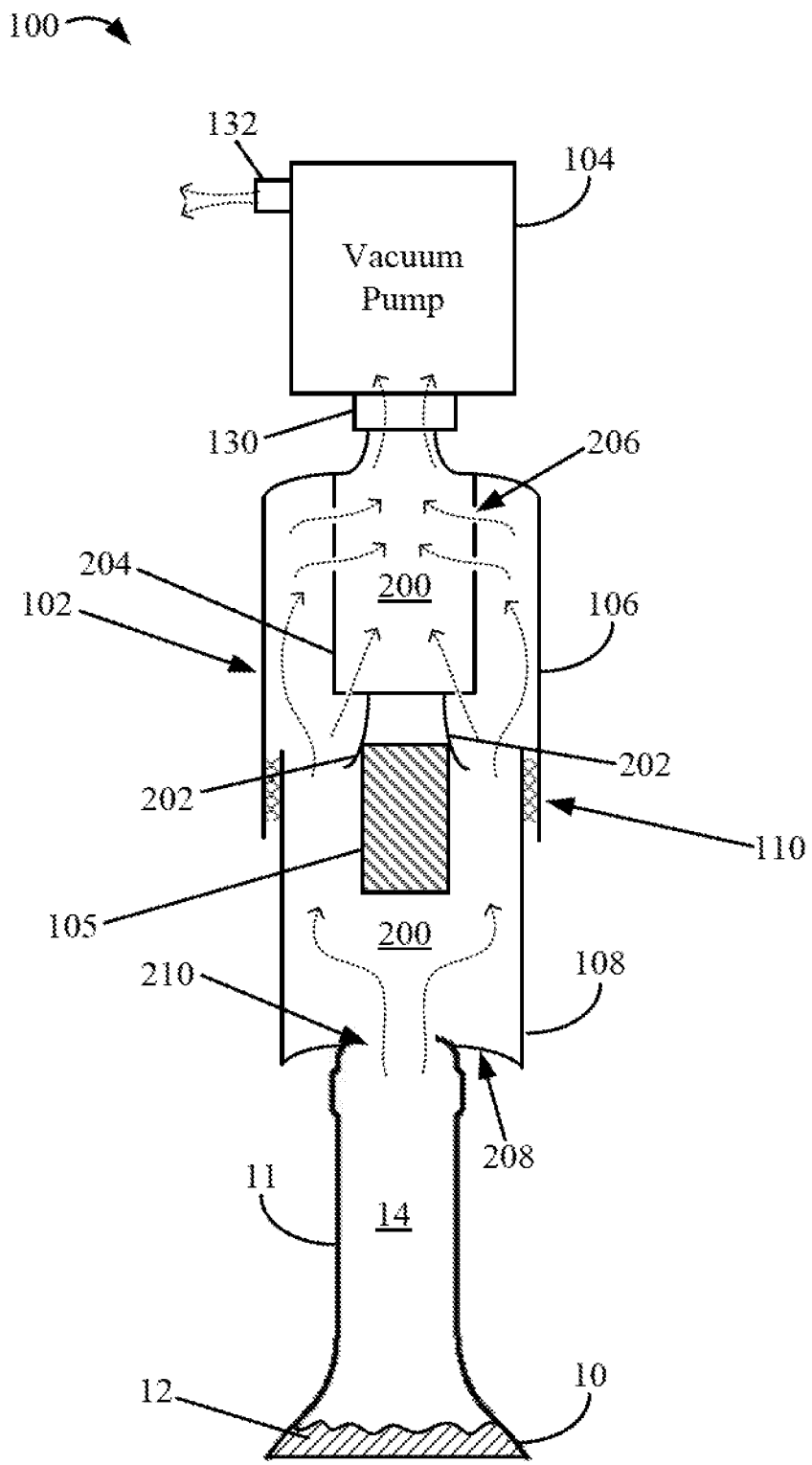
FIG. 2 illustrates a cross-sectional view of the device of FIG. 1 and its features in greater detail.

FIG. 2 illustrates a cross-sectional view of the device 100 and its features in greater detail. The upper portion 106 includes a stopper securement device 202 (e.g., stopper securement device) that is adapted to receive and secure a stopper such as, but not limited to, a cork 105. In one aspect, the stopper securement device 202 may be a plurality of prongs that have a curved shape as shown. In another aspect, the stopper securement device 202 may be a funnel shaped cup having a curved inner surface that is again adapted to receive and secure a cylindrical stopper like a cork. The stopper securement device 202 in all its various forms may constitute examples of a means for securing a stopper 105 within the main body 102.

The stopper securement device 202 may in turn be coupled to a mount 204 that is secured to the inner wall(s) of the upper portion 106. The mount 204 includes a plurality of vents 206 to allow air to pass through the mount 204. According to one aspect, the upper portion 106 and/or mount 204 alone or together may be non-limiting, non-exclusive examples of a means for inserting a stopper 105 into a mouth of a bottle using the stopper securement device 202.

The lower portion 108 includes an elastic bottom surface 208 that fits over the open end of the wine bottle's neck 11 to form an airtight seal between the main body's hollow interior chamber 200 (e.g., "main body's interior air cavity") and the wine bottle's headspace 14. The lower portion 108 also includes an opening 210 that allows air (dashed arrows) to move between the main body chamber 200 and the wine bottle's headspace 14.

Figure 3:
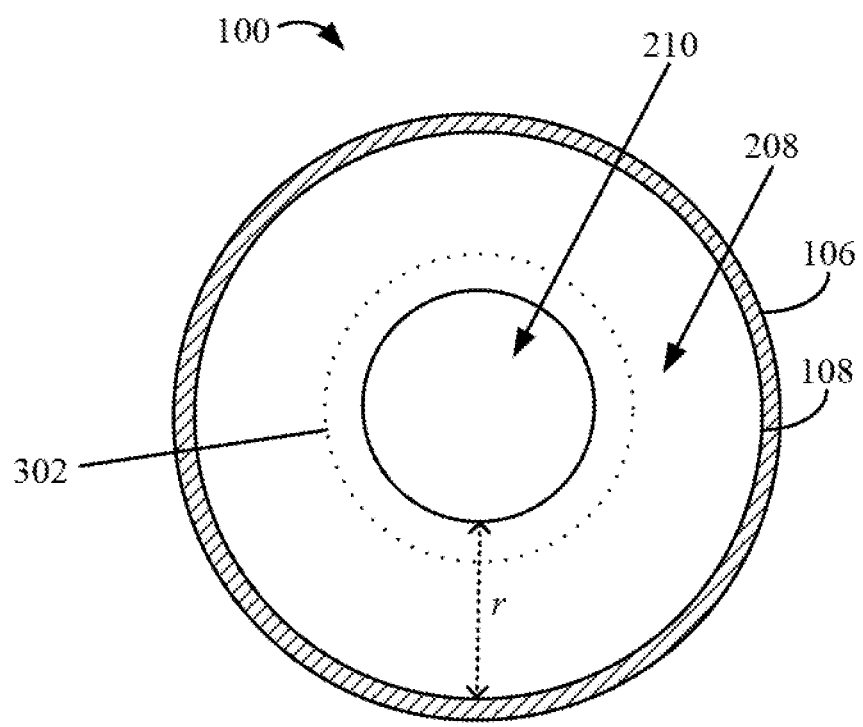
FIG. 3 illustrates a bottom view of the device of FIG. 1.

FIG. 3 illustrates a bottom view of the device 100 according to one aspect. Referring to FIGS. 1-3, the bottom end 122 (e.g., "bottle-receiving end") of the lower portion 108 includes a bottom opening 210 that allows air to flow from the bottle 10 into the main body's chamber 200. Surrounding the bottom opening 210 may be an elastic bottom surface 208 that is adapted to press against the mouth of a bottle (e.g., open end of a wine bottle's neck) and create an airtight seal. The elastic bottom surface 208 may be composed of rubber, silicon, foam, etc. The elastic bottom surface 208 is relatively wide in size (i.e., distance r) so that it can accommodate bottles having mouths of various shapes and sizes. The dotted circle 302 indicates where the mouth of an exemplary bottle may press against the elastic bottom surface 208 as it is inserted through the bottom opening 210.

Figure 4:
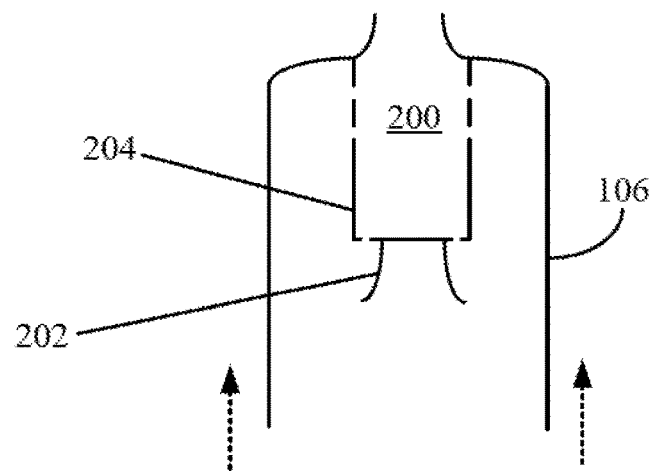
FIG. 4 illustrate that the device may be first opened up by detaching the upper and lower portions of the main body from one another.
Figure 4:
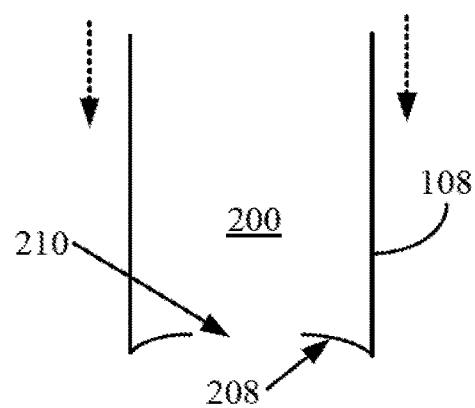
Figure 5:
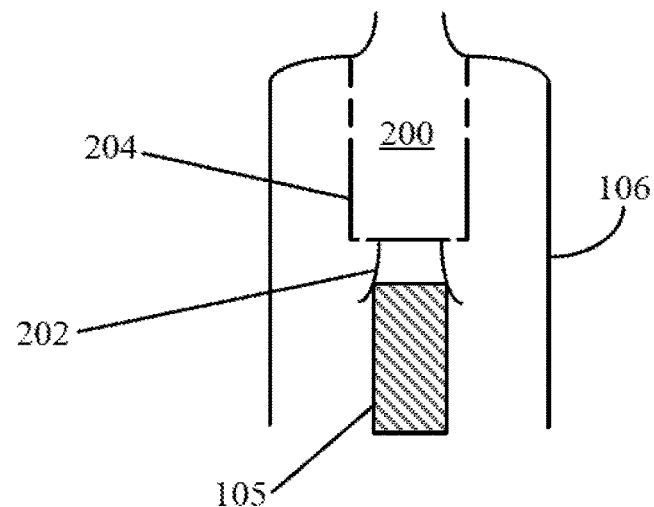
FIG. 5 illustrates a wine bottle cork secured to the stopper securement device.
Figure 6:
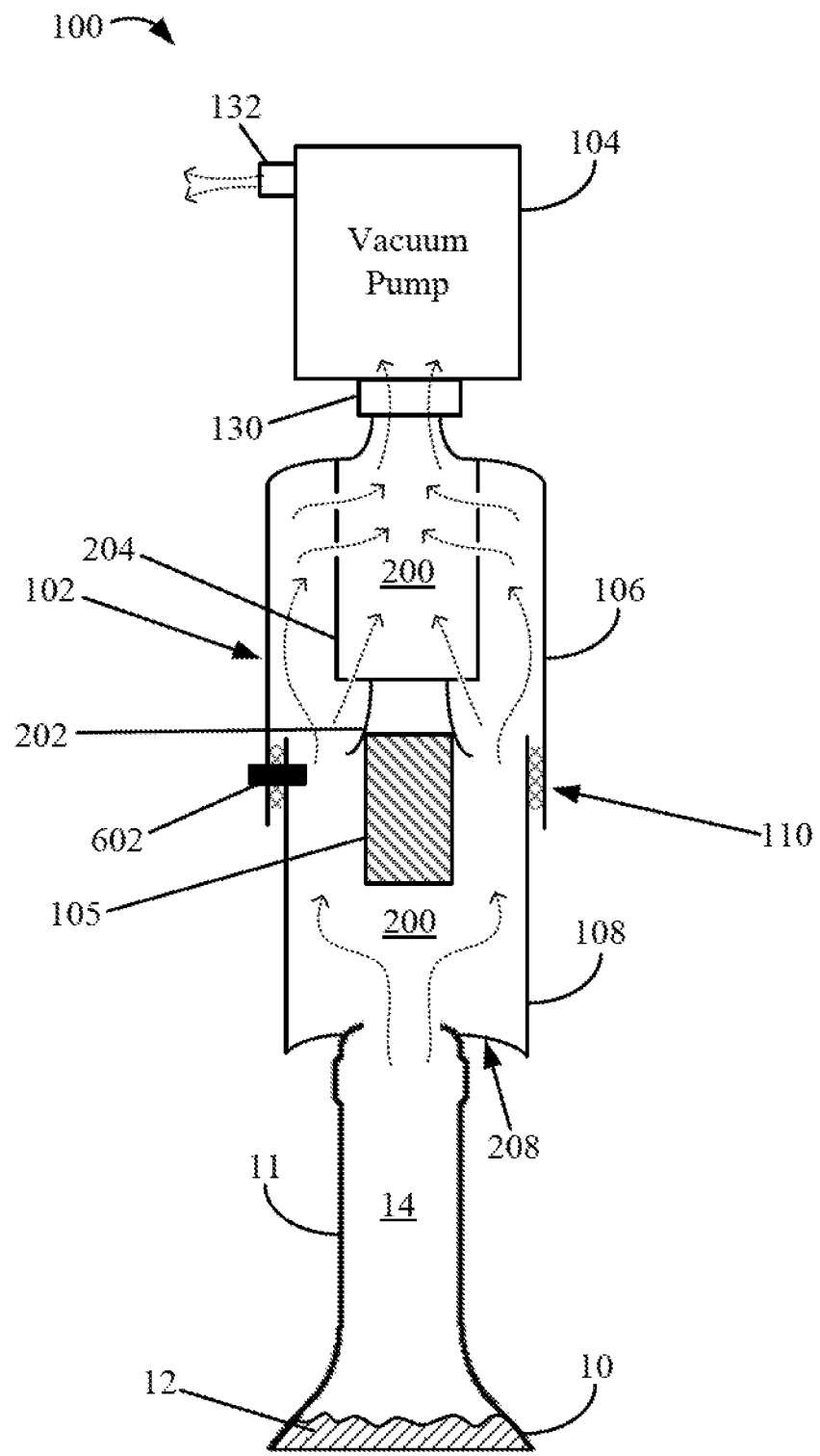
FIG. 6 illustrates the device reassembled and the elastic bottom surface pressed over the wine bottle neck's opening.

FIGS. 4-7 illustrate the device 100 in operation according to one aspect. Referring to FIG. 4, the device 100 is first opened up by, for example, detaching the upper and lower portions 106, 108 of the main body from one another as shown by the dashed arrows. Then, referring to FIG. 5, a wine bottle's cork 105 is secured to the stopper securement device 202 by pressing the cork 105 into the securement device 202. Referring to FIG. 6, the device 100 is then reassembled and the elastic bottom surface 208 is pressed over the wine bottle neck's opening (i.e., bottle's mouth and at least a portion of its neck are inserted through the bottom opening 210.

A user next operates the vacuum pump 104 to draw out air (dashed arrows) within the main body's chamber 200 by creating a vacuum within the chamber 200. The vacuum created within the main body's chamber 200 also draws out air from the open wine bottle's headspace 14 because the main body's inner chamber 200 is in fluid communication with the bottle's headspace 14 via the bottom opening 210. The user continues to work the vacuum pump 104 until a sufficient amount of air is drawn out from the wine bottle's headspace 14. An indicator (e.g., output device 2010 of FIG. 20) may provide notice to the user when a sufficient amount of air has been evacuated. The indicator may be visual or auditory in nature and may measure or otherwise be indicative of the air pressure within the chamber 200.

Note that the device 100 in FIG. 6 is shown in an uncompressed state where the upper and lower portions 106, 108 of the main body 102 are extended from one another yet are still coupled at the juncture 110. A locking mechanism 602 may be utilized to keep the upper and lower portions 106, 108 in the uncompressed position while air is drawn out of the chamber 200 and headspace 14. The lock 602 may be engaged while the vacuum pump 104 is being operated to draw out air from the bottle 10. The lock 602 helps prevent the upper portion 106 from undesirably collapsing down into the lower portion 108 prematurely before the desired volume of air has been evacuated.

Figure 7:
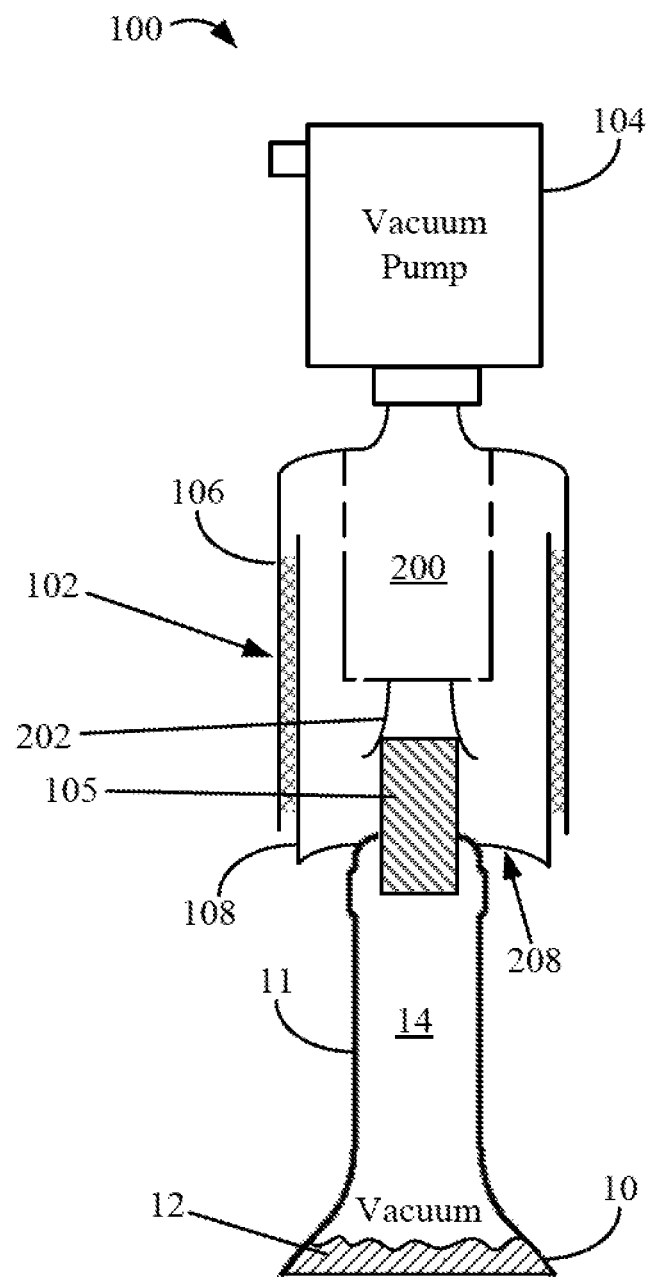
FIG. 7 illustrates the lock being disengaged and the upper portion of the main body pushing downward to lower the stopper into the mouth of the bottle.

Referring to FIG. 7, once a sufficient amount of air has been drawn out from the bottle's headspace 14, the user may disengage the lock 602 and push down on the upper portion 106 of the main body 102 so that it lowers down over the lower portion 108. Lowering the upper portion 106 down also lowers the cork 105 down through the lower portion's opening 210 and into the wine bottle's open end thereby sealing the bottle 10 which is now under vacuum. This places the device 100 in a compressed state with the upper and lower portions 106, 108 pushed in toward each other.

Figure 8:
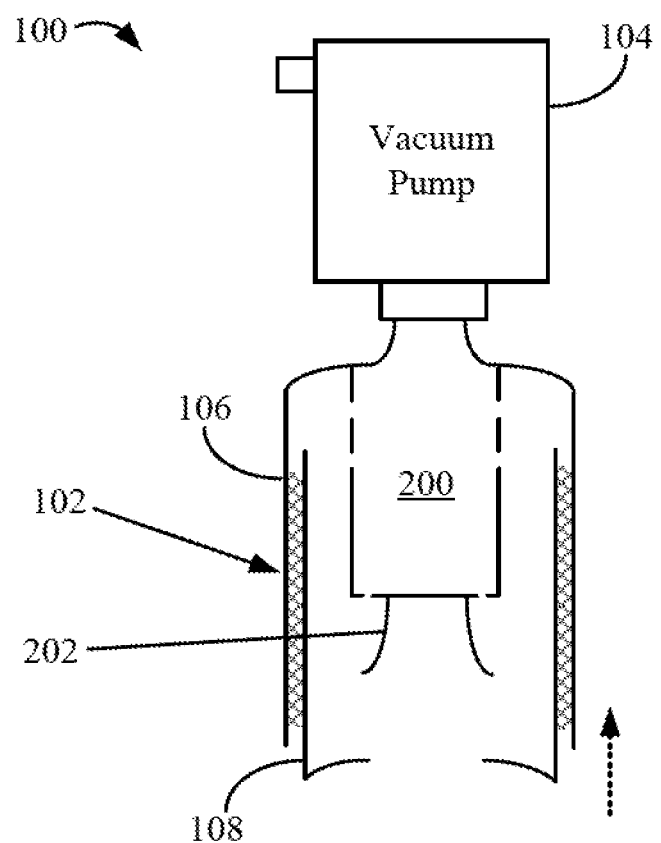
FIG. 8 illustrates ambient air pressure being restored within an interior air cavity of the main body after removing the bottle.
Figure 8:
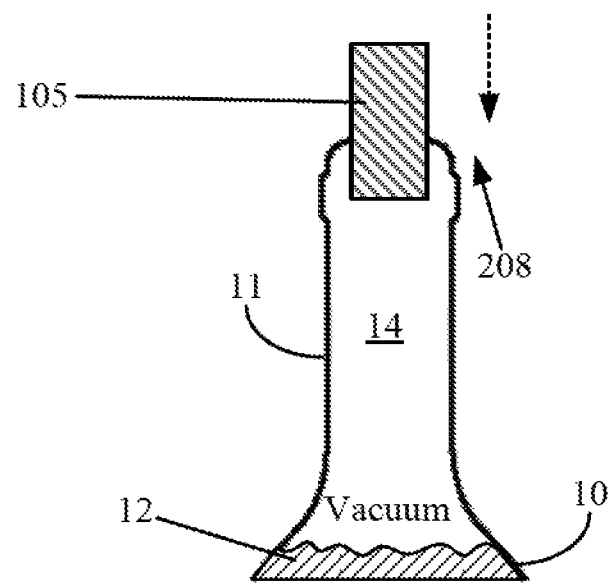

Referring to FIG. 8, after the cork 105 is secured within the bottle 10, ambient air pressure may be restored within the chamber 200 (e.g., detaching the vacuum pump 104) and the main body 102 may be removed from the bottle 10 leaving the cork 105 within the bottle 10. Since the air, including oxygen, within the bottle 10 was evacuated before the cork 105 was secured, the wine is stored under vacuum. The lack of oxygen within the wine bottle 10 helps preserve the wine within. Notably, the wine bottle's own cork 105 may be reused to help preserve the wine and there is no need for specially designed stoppers. The same device may be used to reseal dozens of wine bottles with their own corks without having to purchase a separate device 100 and/or special stopper for each partially opened bottle to be preserved.

Figure 9:
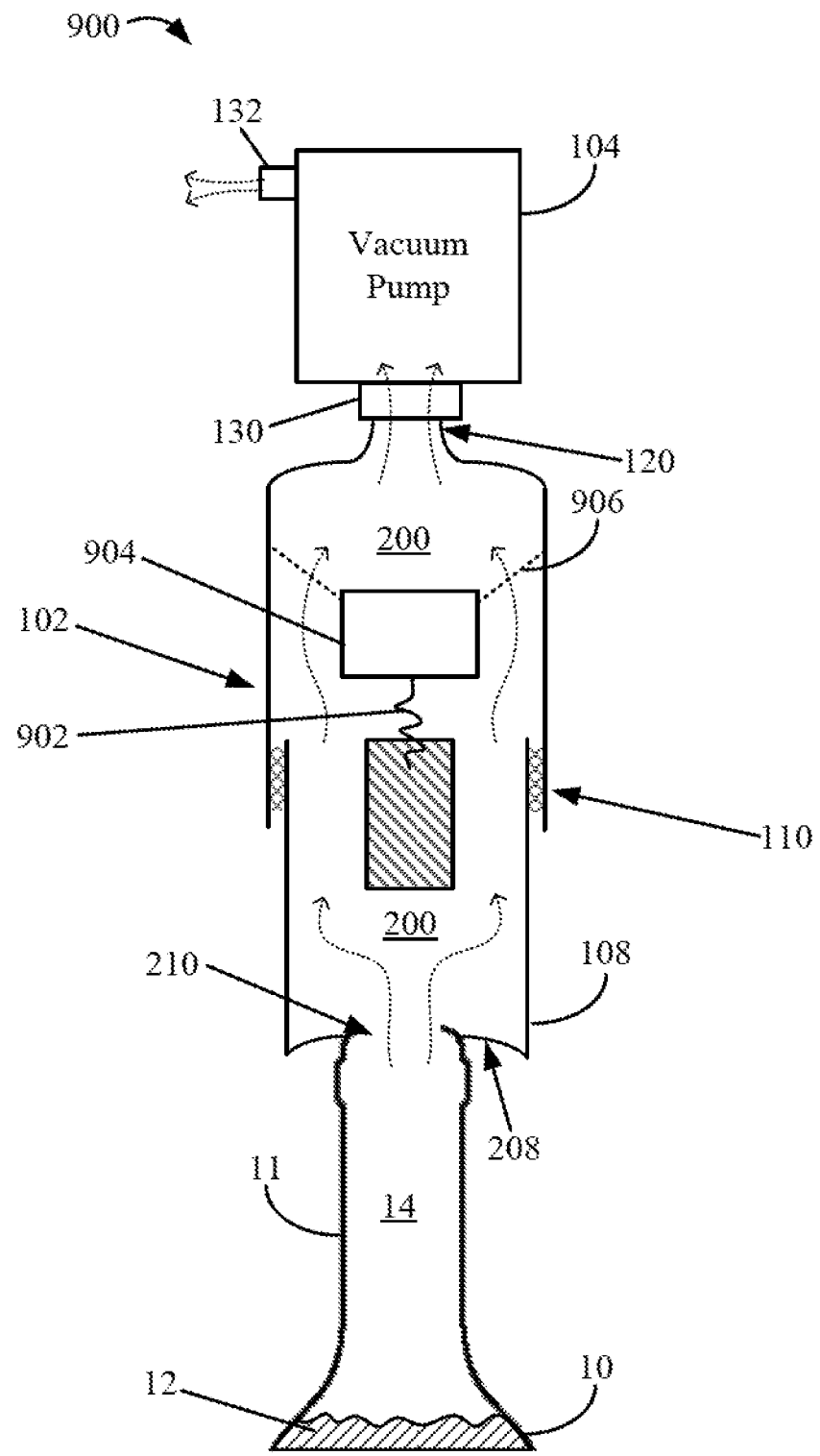
FIG. 9 illustrates another cross-sectional schematic view of a device for evacuating a bottle and securing a stopper within.

FIG. 9 illustrates a cross-sectional schematic view of a device 900 for evacuating a bottle 10 and securing a stopper within according to another aspect. In the illustrated example, the stopper securement device 902 is a pin, threaded screw, or a corkscrew, which may all be examples of a means for securing a stopper 105 within the main body 102. The stopper securement device 902 is secured to a stopper securement device mount 904 that is secured to one or more walls of the upper portion's inner surface via one or more support members 906 such as support rods, plates, pieces, etc. The support members 906 may be evenly spaced like spokes to allow air to flow unimpeded from the lower portion's opening 210 and out through the opening 120 at the top portion 106 near the vacuum pump 104. In FIGS. 1-4 and 6-9, the device's upper portion 106 is depicted as having a larger diameter than the lower portion 108. However, in another aspect, this may be reversed so that the upper portion 106 fits within the lower portion 108. According to one aspect, the upper portion 106 and/or the mount 904 alone or together may constitute some examples of means for inserting a stopper 105 into a mouth of a bottle using the stopper securement device 902.

Figure 10:
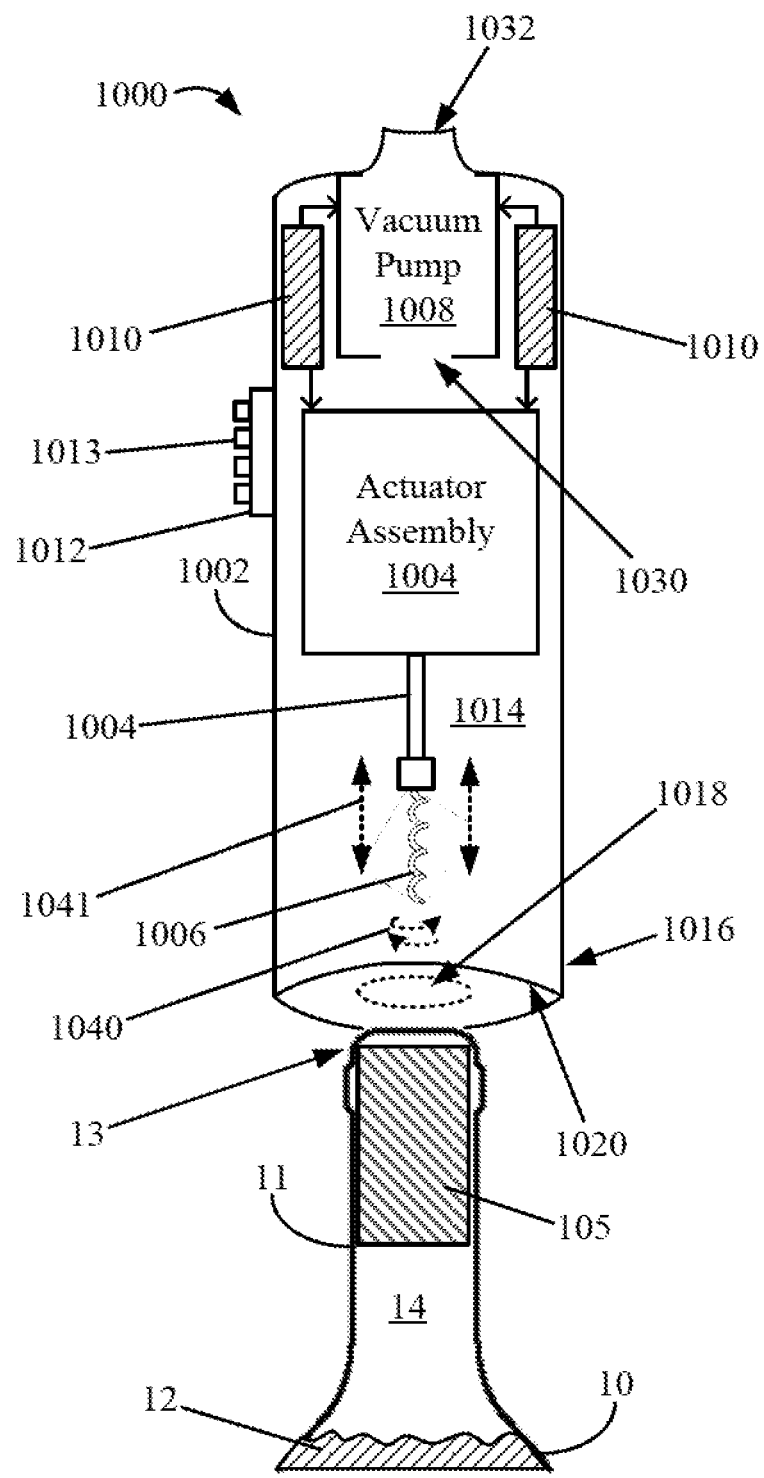
FIG. 10 illustrates yet another cross-sectional schematic view of a device.

FIG. 10 illustrates a cross-sectional schematic view of a device 1000 (e.g., apparatus) according to one aspect. As just one example, the device 1000 may be used to: remove a stopper (e.g., natural cork, rubber cork, etc.) 105 from the neck 11 of a bottle 10; evacuate air containing oxygen from a wine bottle's headspace 14; and reseal the wine bottle 10 using the same stopper 105 previously removed. For the sake of clarity the description that follows assumes the device 1000 is used to open and reseal a bottle of wine having a cork. However, in practice the device 1000 may be used to evacuate air from different types of bottles or containers that contain different types liquids and/or solids. The device 1000 may then be used to reseal such bottles or containers after the air within their headspace has been evacuated.

The device 1000 may include a main body 1002 (e.g., housing) that houses various components of the device 1000 such as, but not limited to, an actuator assembly 1004, a stopper securement device 1006, a vacuum pump 1008, a power source 1010 (e.g., batteries, transformer, etc.), and/or an input/output (I/O) interface 1012. The main body 1002 may be relatively small so that the device 1000 may be held in the hand of a user. The main body 1002 may be cylindrical in shape as shown or may have other generalized shapes like a rectangular or hexagonal prism shape.

Space within the main body 1002 that is unoccupied by one or more of these components forms an interior air cavity 1014 of the device 1000. As described in greater detail below, the vacuum pump 1008 is used to evacuate air within this interior air cavity 1014 and also the headspace 14 of a bottle coupled to a bottom end 1016 of the device 1000. In the example illustrated in FIG. 10, the main body 1002 substantially houses the vacuum pump 1008. In other aspect of the disclosure, the vacuum pump may be external to the main body 1002, similar to the device 100 shown in FIG. 2. According to one non-limiting, non-exclusive example, the stopper securement device 1006, which may be one example of a means for securing a stopper within the main body 1002 of the device, may be a corkscrew as shown. However, in practice the stoppers securement device 1006 may be any device of varying designs and construction that may secure to grasp a stopper such as a cork. For the sake of clarity and brevity the stopper securement device 1006 may be referred to below as simply a corkscrew.

Referring to FIG. 10, the actuator assembly 1004 is coupled to the corkscrew 1006 and is used to rotate 1040 the corkscrew 1006 and also move it in a longitudinal direction (e.g., up and down; toward and away from the bottle's cork) 1041. The actuator assembly 1004 may be hydraulic, pneumatic, electric, and/or mechanical in nature and operation. However, in preferred aspects, the actuator assembly 1004 is electric and/or mechanical. For example the actuator assembly 1004 may include an electric motor, gears, and a driveshaft to drive the corkscrew 1006 up and down in the longitudinal direction 1041 and also rotate 1040 the corkscrew 1006 clockwise and counterclockwise. As described in greater detail below, the actuator assembly 1004 drives the corkscrew 1006 into a cork 105 lodged within a bottle's neck and removes the cork 105. The actuator assembly 1004 and corkscrew 1006 may also drive the cork 105 back into the bottle to reseal the bottle. The actuator assembly 1004 may be one non-limiting, non-exclusive example of a means for inserting the stopper 105 into the mouth 13 of the bottle 10 using the stopper securement device 1006.

The vacuum pump 1008 evacuates air contained within the main body's air cavity 1014 and also the headspace 14 of the bottle 10 and releases it outside of the device 1000. Specifically, the vacuum pump 1008 may draw in air contained within the cavity 1014 and headspace 14 from its inlet 1030 and releases the air out through its outlet 1032. Various types of vacuum pumps 1008 known in the art may be used. In one aspect, such as the example shown in FIG. 10, the vacuum pump 1008 is a battery powered positive displacement pump. In other aspects, the vacuum pump may be a manually-operated (e.g., hand) positive displacement pump. Regardless of the specific operative characteristics of the vacuum pump 1008 used, the vacuum pump's inlet 1030 is within or otherwise exposed to the main body's cavity 1014 so that it can draw in air from within the main body's cavity 1014 and bottle's headspace 14 and release it out through its outlet 1032 to the ambient air outside of the device 1000.

The main body's bottom end 1016 (e.g., herein referred to as either "main body's first end" or "bottle-receiving end") is adapted to couple to and form an airtight seal around the bottle's neck 11 and/or mouth 13. The bottom end 1016 includes an bottom opening 1018 large enough to allow a bottle's stopper (e.g., wine bottle cork/stopper) to pass through it. The opening 1018 also allows air to be drawn out from the bottle's headspace 14 into the main body's interior air cavity 1014 when the device's vacuum pump 1008 is operating. The bottom end 1016 may feature different components to help maintain an airtight seal around the bottle's neck 11 and/or mouth 13 so that air drawn into main body's interior air cavity 1014 is drawn in from the bottle's headspace 14 and not from ambient air located outside of the mouth 13 of the bottle 10.

According to one non-limiting, non-exclusive example, the bottom end 1016 may feature an elastic bottom surface 1020 like the elastic bottom surface 208 shown and described herein with respect to FIG. 3. The elastic bottom surface 1020 surrounds the bottom opening 1018 and may be made of rubber, silicone, and/or airtight, dense foam that when fitted over the bottle's mouth 13 and/or neck 11 substantially prevents ambient air outside of the bottle from entering the headspace 14 or main body's interior air cavity 1014.

Figure 11:
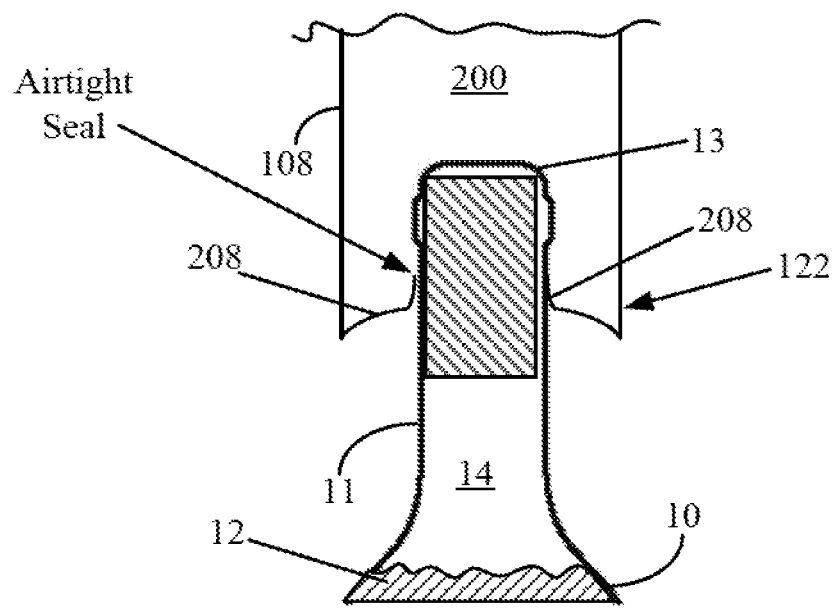
FIGS. 11 and 12 illustrate cross-sectional views of non-limiting, non-exclusive examples of how the elastic bottom surfaces fit over a bottle's neck and mouth to form an airtight seal.
Figure 12:
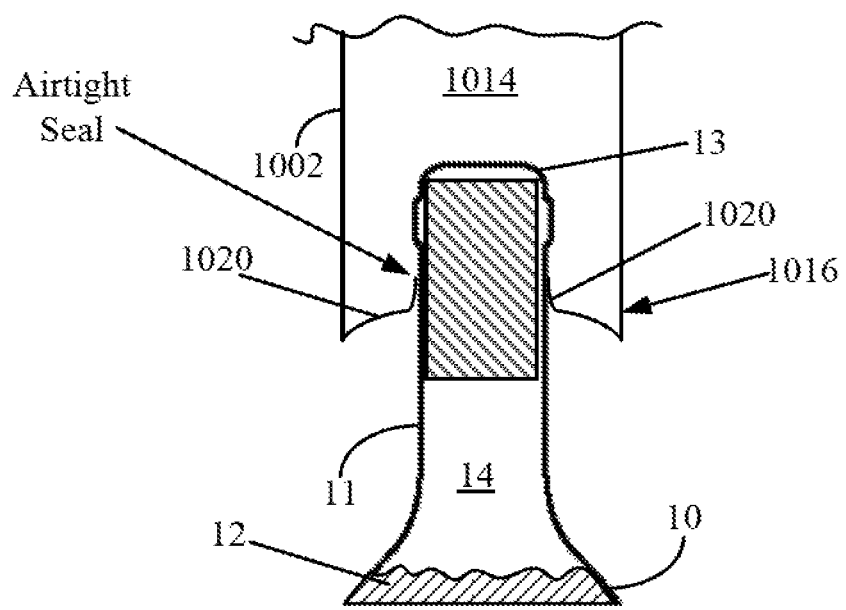

FIGS. 11 and 12 illustrate cross-sectional views of non-limiting, non-exclusive examples of how the elastic bottom surfaces 208, 1020 fit over a bottle's neck 11 and mouth 13 to form an airtight seal. In both FIGS. 11 and 12 the bottle's mouth 13 and neck 11 pass through the bottom opening 210, 1018 (see FIGS. 2 and 10) of the device 100, 1000 while the elastic bottom surfaces 208, 1020 press up against the sides of the bottle's neck 11 and/or mouth 13 all the way around the circumference of the bottle's neck 11 and/or mouth 13. This forms an airtight seal around the circumference of the bottle's neck 11 and/or mouth 13.

Figure 13:
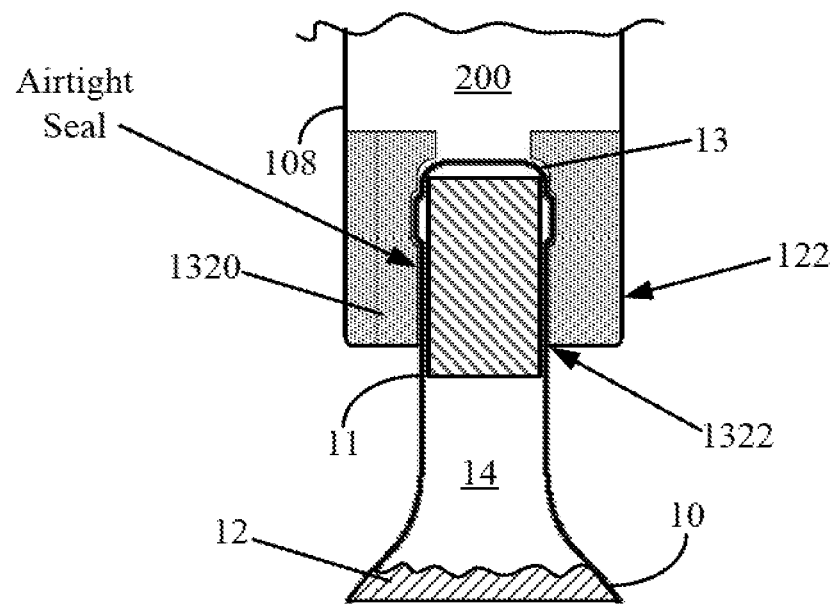
FIGS. 13 and 14 illustrate cross-sectional views of other non-limiting, non-exclusive examples of how the bottom ends of the devices may form airtight seals with a bottle.
Figure 14:
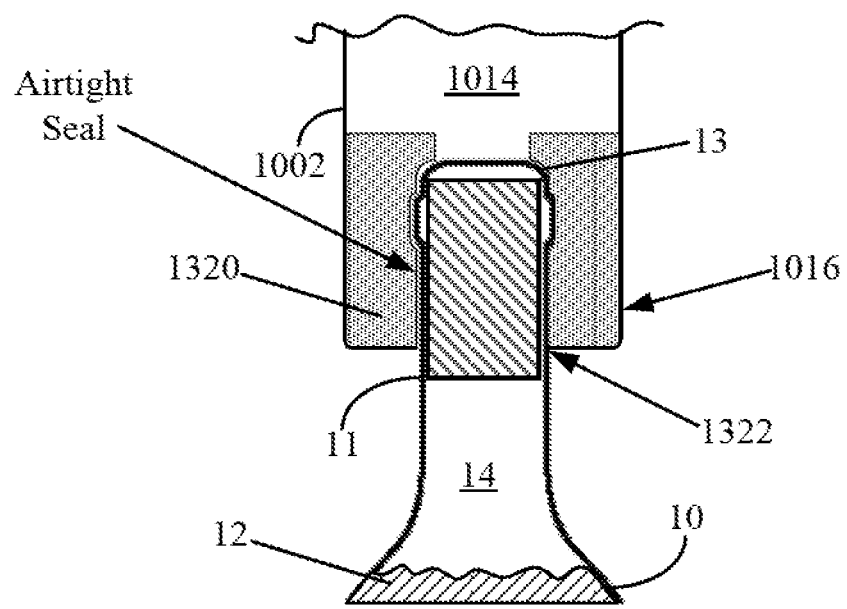

FIGS. 13 and 14 illustrate cross-sectional views of other non-limiting, non-exclusive examples of how the bottom ends 122, 1016 of the devices 100, 1000 may form airtight seals with a bottle 10. The devices' bottom ends 122, 1016 may include an airtight, dense foam ring 1320 that snugly fits over a bottle's neck 11 and mouth 13 to form an airtight seal. In both FIGS. 13 and 14 the bottle's mouth 13 and neck 11 pass through a bottom opening 1322 of the device 100, 1000 while the foam ring 1320 presses up against the sides of the bottle's neck 11 and/or mouth 13 all the way around the circumference of the bottle's neck 11 and/or mouth 13. This forms an airtight seal around the circumference of the bottle's neck 11 and/or mouth 13.

Referring back to FIG. 10, the power source 1010 may be one or more batteries according to one aspect. In the case where the power source 1010 is a battery, it may provide electrical power (e.g., direct current (DC)) to a DC electric motor of the actuator assembly 1004. The battery may also provide electrical power to the vacuum pump 1008 in aspects where the vacuum pump 1008 is electrically powered. The battery may also provide electrical power to other electronic components (e.g., I/O interface 1012) or circuits of the device 1000.

According to one aspect, the I/O interface 1012 may include a plurality of buttons 1013 that control the actuator assembly 1004 and/or the vacuum pump 1008. For example, one button 1013 may cause the actuator assembly 1004 to lower or extend out the corkscrew 1006 and rotate it in such a direction so as to cause the corkscrew 1006 to penetrate the bottle's stopper 105 and be firmly secured therein. Another button or the same button may then cause the actuator assembly 1004 to then raise or retract the corkscrew 1006 without rotation so as to pull the bottle's stopper 105 out from its position within the bottle's neck 11. Yet another button may then cause the actuator assembly 1004 to lower or extend the corkscrew 1006 with the stopper 105 still attached back into the bottle's neck 11. Yet another button or the same button may then cause the actuator assembly 1004 to raise or retract the corkscrew 1006 and rotate the corkscrew 1006 in an opposite direction so as to leave the stopper 105 within the bottle's neck while withdrawing the corkscrew 1006 from the stopper 105.

According to one aspect, the I/O interface 1012 may include a display that provides the user with operational information of the device 1000, such as, what setting the device 1000 is currently in, any operational errors or warnings for the device 1000, battery life, battery charging progress, etc. While not shown in FIG. 10, the device 1000 may also include various electronic components such as controllers, buses, memory, etc. that are known to one of ordinary skill in the art to allow the I/O interface to send control instructions to the actuator assembly 1004 and the vacuum pump 1008 as well as receive signals and data back from such systems 1004, 1008.

FIGS. 15-19 illustrate the device 1000 in operation according to one aspect of the disclosure.

Figure 15:
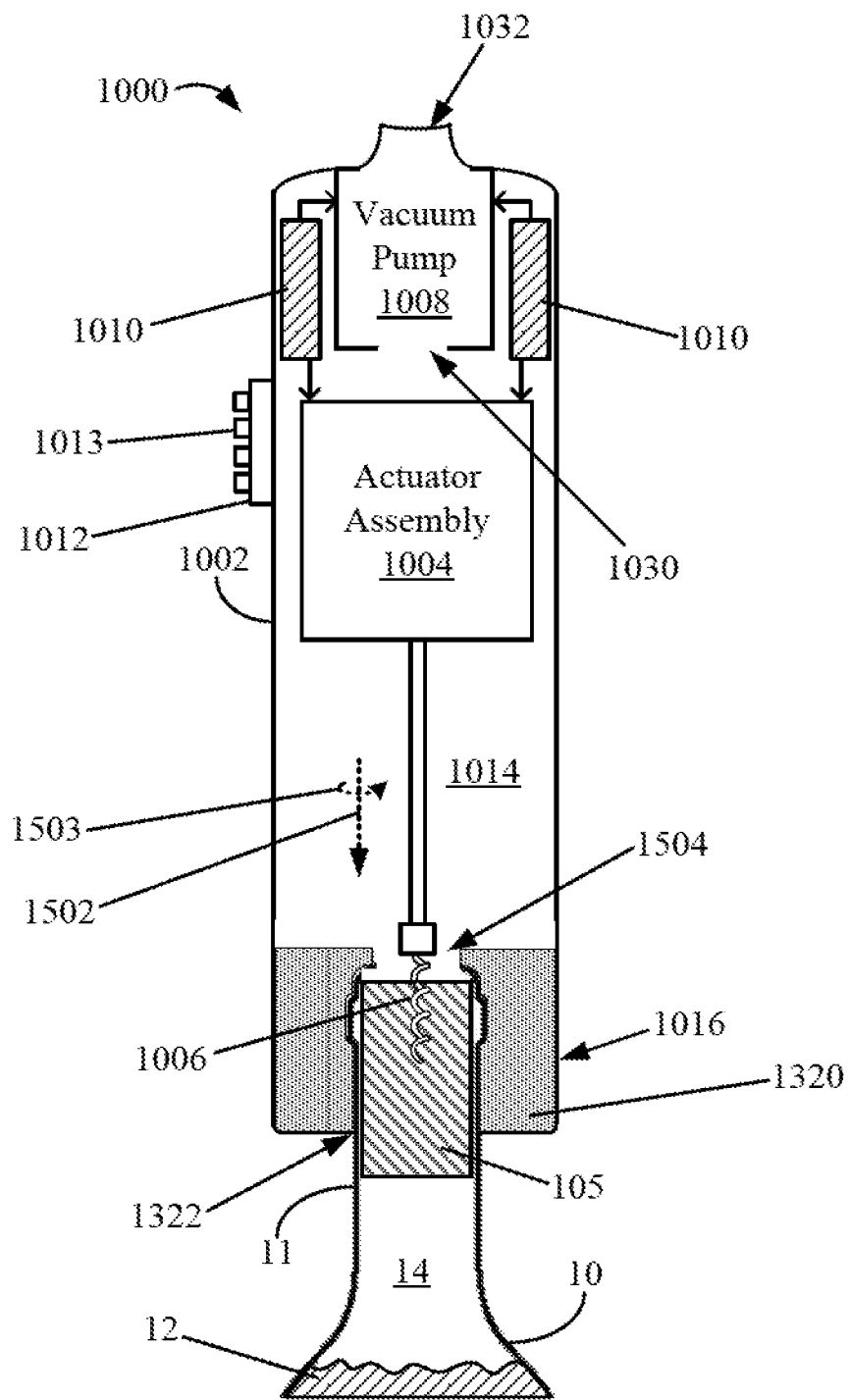
FIG. 15 illustrates a cross-sectional schematic view of the device in a bottle opening state.

FIG. 15 illustrates a cross-sectional schematic view of the device 1000 in a bottle opening state according to one aspect. First, an unopened bottle 10 (e.g., unopened bottle of wine) having a stopper 105 secured within its neck 11 may be inserted into the bottom end 1016 of the device 1000 through the bottom opening 1322. In the example shown in FIGS. 15-19, the device's bottom end 1016 features the airtight, dense foam ring 1320 shown in FIG. 14. However, the same principles of operation described in FIGS. 15-19 equally apply to a device 1000 featuring a different means for receiving a bottle and forming an airtight seal between the bottle and the device such as, but not limited to, the elastic bottom surface 1020 shown in FIGS. 3 and 12.

After the unopened bottle 10 has been securely inserted into the bottom end 1016 of the device 1000, a user may press a button 1013 on the I/O interface 1012 that causes the actuator assembly 1004 to lower/extend 1502 and rotate 1503 the corkscrew 1006 into a bottle's stopper 105 (e.g., wine bottle's cork). The corkscrew 1006 may continue to lower and rotate until it goes past the foam ring 1320 through ring's center opening 1504 and firmly and securely embeds itself within the stopper 105 as shown.

Figure 16:
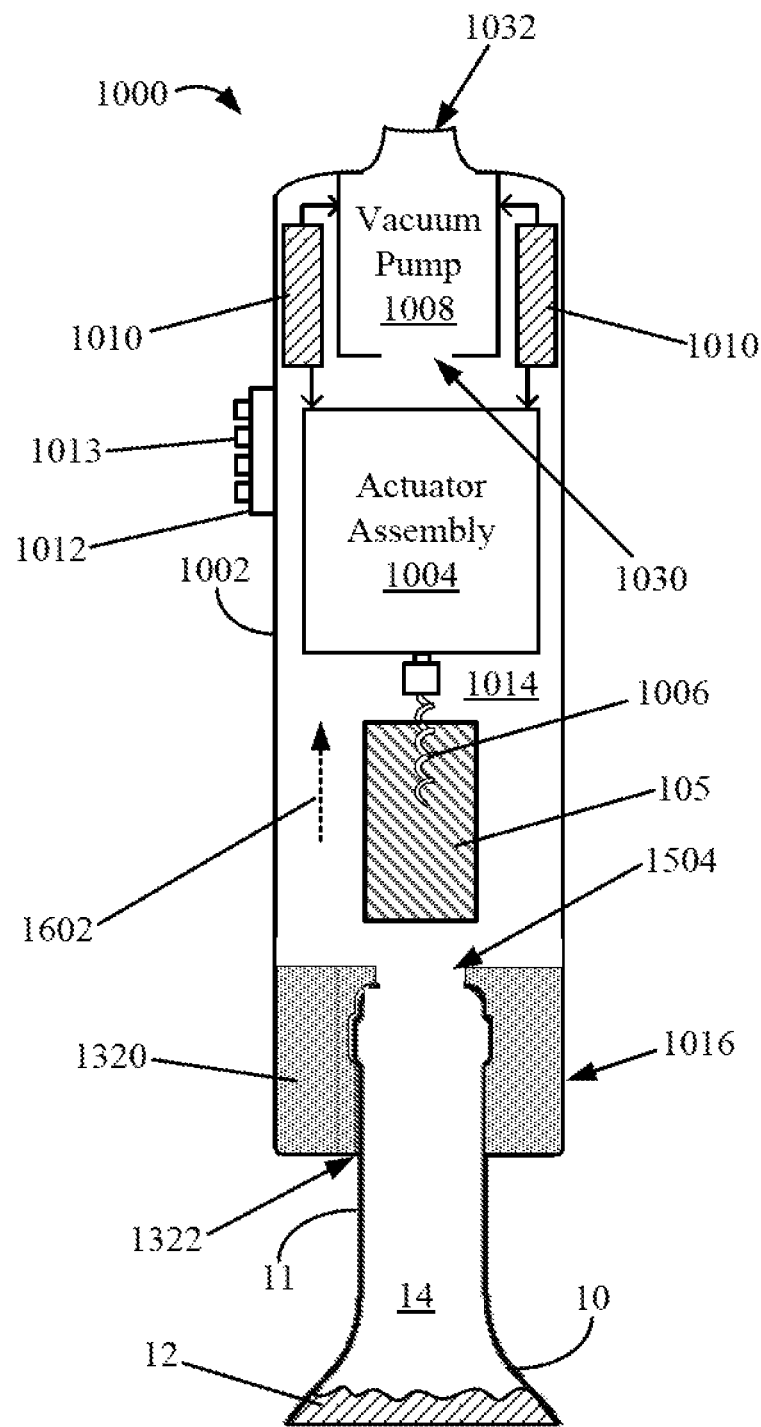
FIG. 16 illustrates a cross-sectional schematic view of the device in a bottle opened state.

FIG. 16 illustrates a cross-sectional schematic view of the device 1000 in a bottle opened state according to one aspect. Once the corkscrew 1006 is firmly and securely embedded within the stopper 105, a user may select another button 1013 on the I/O interface 1012 to cause the actuator assembly 1004 to raise/retract 1602 the corkscrew 1006 (without rotation). The actuator assembly 1004 may raise/retract the corkscrew 1006 with the stopper 105 still firmly attached to the corkscrew 1006 until both the corkscrew 1006 and the stopper 105 have been fully removed from the bottle 10 and reside within the device's main body 1002 as shown. The bottle 10 may at this point be removed from the device's bottom end 1016 and its contents 12 (e.g., wine, spirit, herbs, etc.) may be served.

Figure 17:
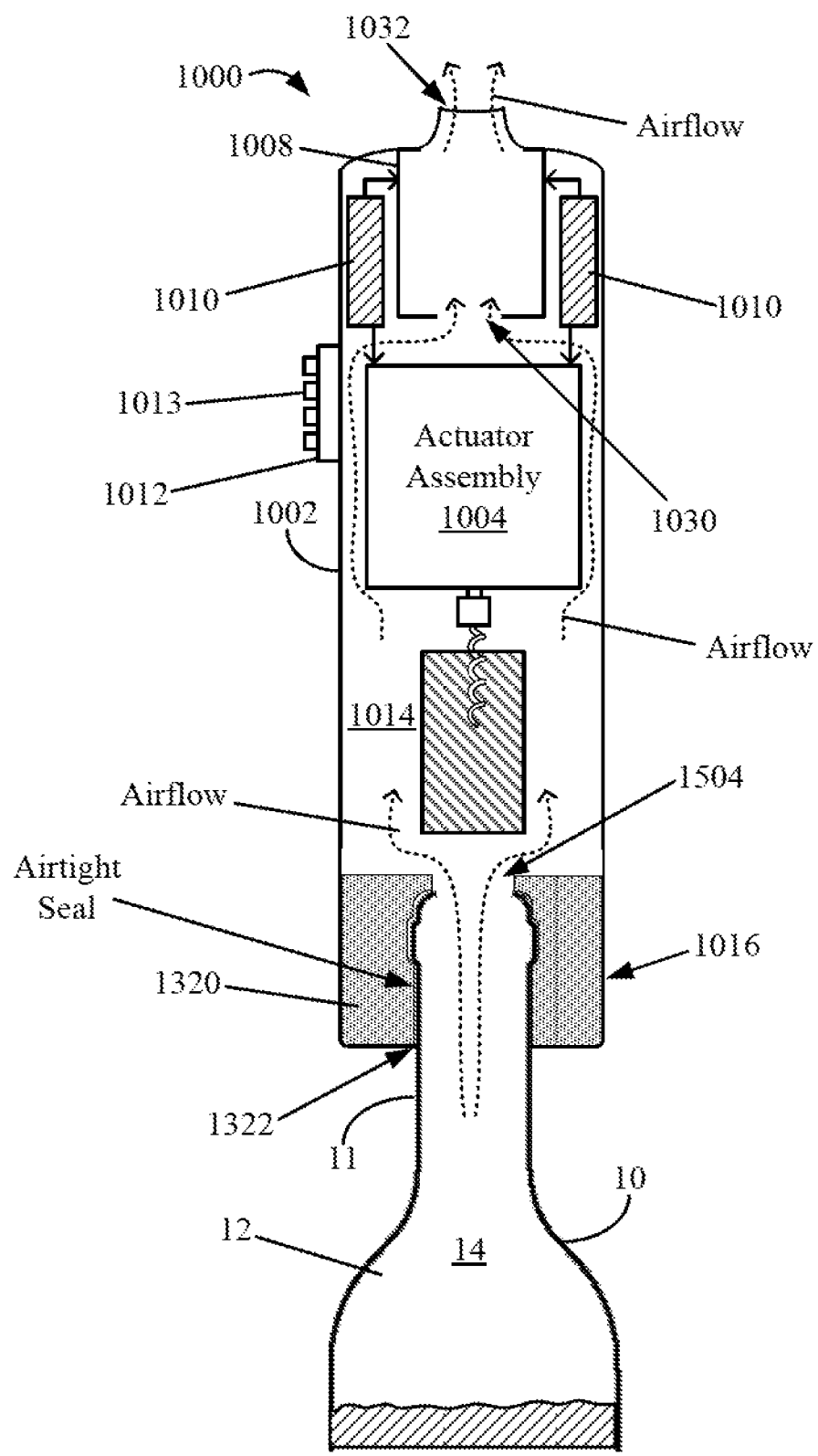
FIG. 17 illustrates a cross-sectional schematic view of the device in a vacuum induction state.

FIG. 17 illustrates a cross-sectional schematic view of the device 1000 in a vacuum induction state according to one aspect. After the bottle's contents 12 may have been served in part, the remaining content 12 (e.g., wine) may be preserved by reinserting the bottle 10 back into the device's bottom end 1016 through the bottom opening 1322 (or bottom opening 210 in the case where the device features the elastic bottom surface 208; see FIGS. 2, 3, 11) so that the bottle's headspace 14 and the main body's cavity 1014 are in fluid flow communication. The bottle 10 should be inserted back into the device's bottom end 1016 so that a sufficient airtight seal is formed between the bottle 10 (e.g., outer surface of the bottle's neck 11 and/or mouth 13) and the device's bottom end 1016. The user may then select a button 1013 that turns the vacuum pump 1008 ON. The vacuum pump 1008 evacuates the air within the bottle's headspace 14 and the main body's cavity 1014 and discharges it outside the device 1000 so that a vacuum or partial vacuum of sufficient degree is achieved within the bottle's headspace 14. An indicator (e.g., LED light or digital display) on the I/O interface 1012 may be activated to let the user know that a sufficient level of partial vacuum or full vacuum within the bottle's headspace 14 has been achieved. The airtight seal between the bottle and the device's bottom end 1016 ensures that a sufficiently strong vacuum within the bottle's headspace 14 is created without ambient air outside the bottle's neck 11 from seeping into the main body's cavity 1014 or bottle's headspace 14.

Figure 18:
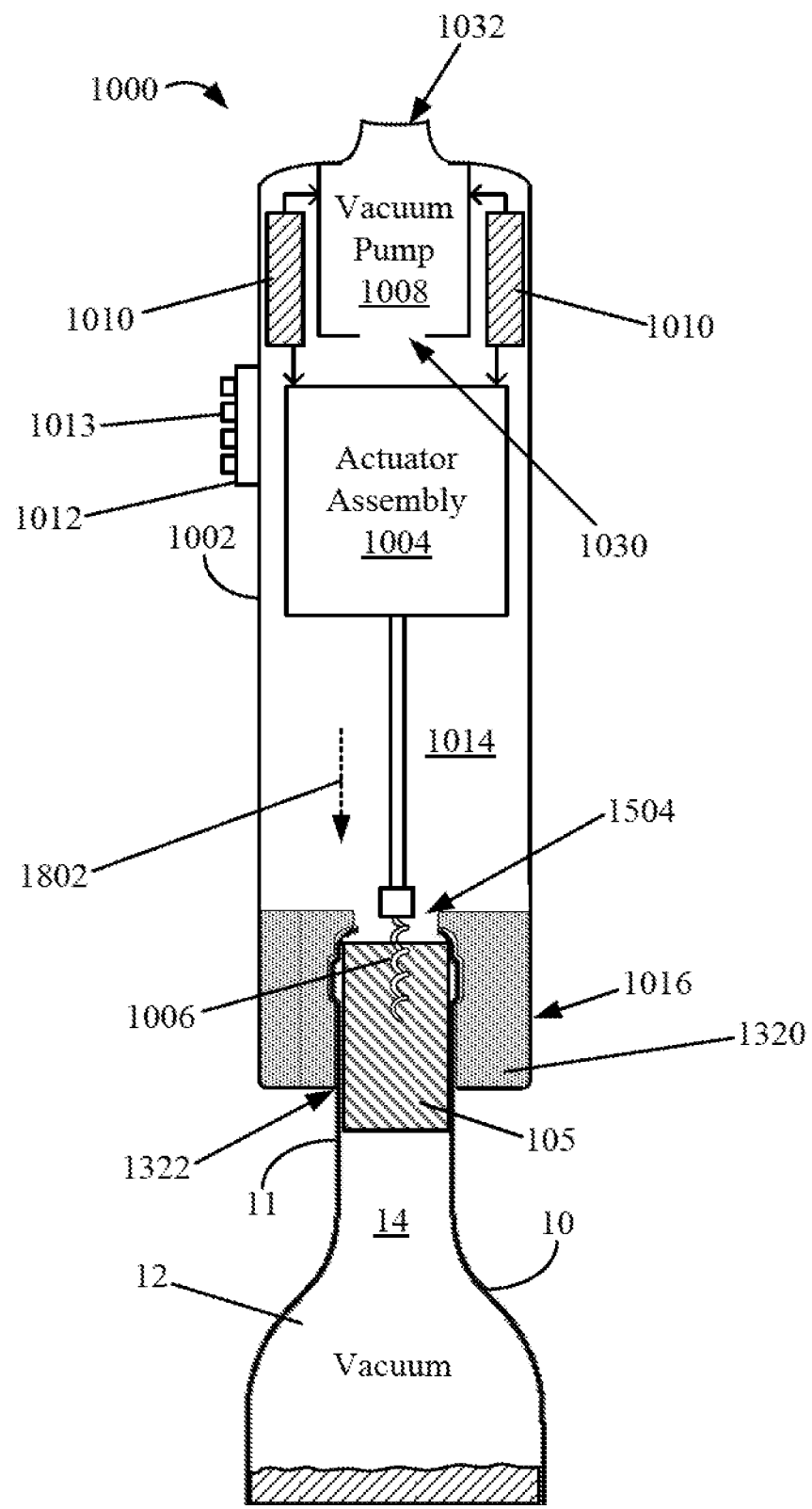
FIG. 18 illustrates a cross-sectional schematic view of the device in a resealing state.

FIG. 18 illustrates a cross-sectional schematic view of the device 1000 in a resealing state according to one aspect. After the vacuum pump 1008 has run long enough to create a vacuum or a desired level of partial vacuum within the bottle's headspace 14, the user may press a button 1013 on the interface 1012 or the device 1000 may automatically cause the actuator assembly 1004 to lower/extend 1802 the corkscrew 1006 with the stopper 105 attached back into neck 11 of the bottle 10. According to one aspect, the corkscrew 1006 may not rotate while it is being lowered and pressed back into the bottle's neck 11. According to another aspect, the corkscrew 1006 may undergo some rotation while it is being lowered and/or pressed back into the bottle's neck 11. The rotation may be in a direction that further secures the corkscrew 1006 into the stopper 105. Doing so may help the stopper 105, which may have slightly expanded since having been removed from the bottle's neck 11, to fit back into the bottle's neck 11 while it is being pressed inside. Yet according to another aspect, the corkscrew 1006 may rotate in the opposite direction (i.e., loosening the corkscrew's 1006 grip on the stopper 105) while it is being lowered and/or pressed into the bottle's neck 11.

Figure 19:
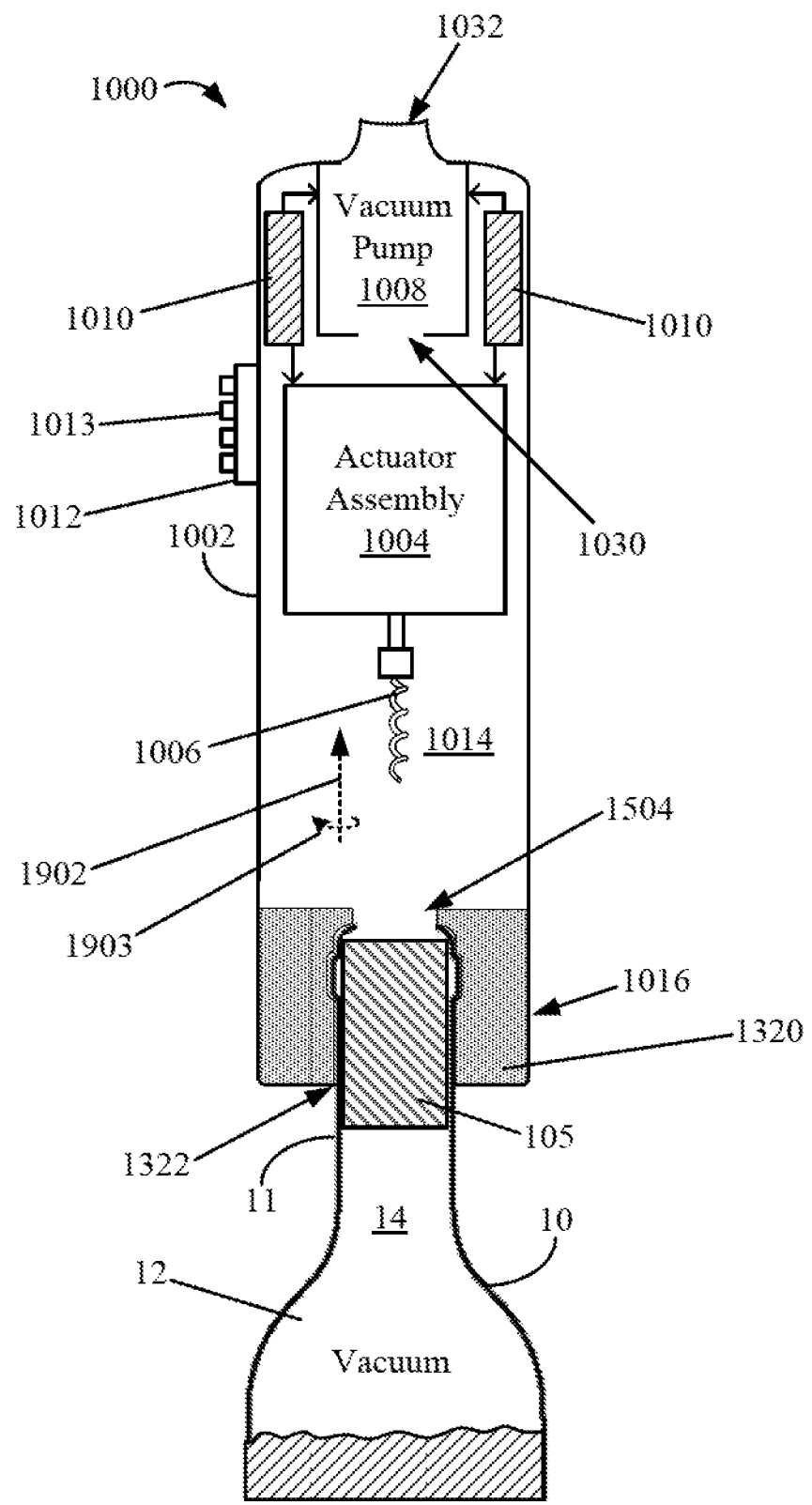
FIG. 19 illustrates a cross-sectional schematic view of the device in a vacuum resealed state.

FIG. 19 illustrates a cross-sectional schematic view of the device 1000 in a vacuum resealed state according to one aspect. Once the actuator assembly 1004 has pressed and secured the stopper 105 back into the bottle 10, a user may press a button 1013 or the device 1000 may automatically cause the actuator assembly 1004 to raise/retract 1902 and rotate 1903 the corkscrew 1006 out of the stopper 105 and back into the device's main body 1002. The corkscrew 1006 may be rotated 1903 in a direction opposite the original direction of rotation 1503 (see FIG. 15) so that it detaches from the stopper 105 while retracting. The bottle's contents 12 is now stored under vacuum or partial vacuum, which may significantly lengthen the contents' shelf life (e.g., prevent spoilage, prevent or reduce oxidation, maintain taste, smell, and freshness).

Figure 20:
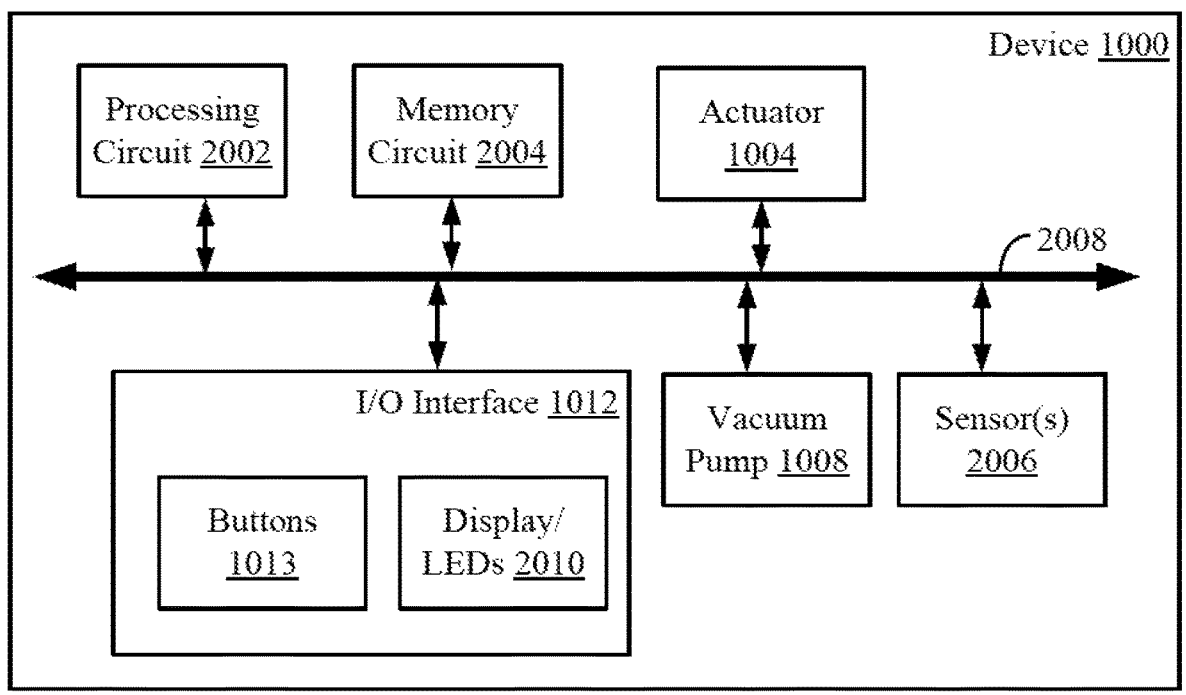
FIG. 20 illustrates a schematic block diagram of the device according to yet another aspect.

The corkscrew 1006 shown and described with respect to FIGS. 10, 15, 16, 17, 18, and 19 serves as one non-limiting, non-exclusive example of a means for securing a stopper 105 within the main body 1002 of the device 1000. However, many other devices having varying structure may be used to secure the stopper 105 within the main body 1002 not limited to corkscrews FIG. 20 illustrates a schematic block diagram of the device 1000 according to one aspect. The device 1000 may include one or more processing circuits 2002 (e.g., controller, microcontroller, etc.), one or more memory circuits 2004, an I/O interface 1012, an actuator 1004, a vacuum pump 1008, one or more sensors 2006, and/or a communication bus 2008. The processing circuit 2002, memory circuit 2004, I/O interface 1012, actuator 1004, vacuum pump 1008, and sensors 2006 may be communicatively coupled via the communication bus 2008 or other communication line architecture known in the art.

The processing circuit 2002 may execute instructions that send control signals to the actuator 1004, vacuum pump 1008, and I/O interface 1012 devices to control their operation. The memory circuit 2004 may store the instructions executed by the processing circuit 2002. The memory circuit 2004 may include volatile and/or non-volatile memory. The I/O interface 1012 may include one or more buttons 1013 that allow a user to configure or control the device 1000. The I/O interface 1012 may also include a display, lights (e.g., LEDs), and other output devices 2010 that provide information as to the operation and condition of the device 1000 to a user. The sensors 2006 may include an air pressure sensor that can determine whether the air pressure within the interior air cavity 1014 (see FIG. 17) of the main body 1002, and by extension the bottle's headspace 14, has dropped to a sufficiently low level (i.e., partial or total vacuum) to allow for resealing of the bottle 10. The processing circuit 2002 may obtain such air pressure data from the sensor 2006 and initiate the actuator assembly 1004 to seal the bottle by inserting the stopper 105 back into the bottle's mouth 13.

FIG. 21 illustrates a flow diagram 2100 of a method according to one aspect of the disclosure. First, a mouth of a bottle is inserted 2102 into a bottom opening of a bottle-receiving end of a device to form a substantially airtight seal between the bottle-receiving end of the device and an exterior surface of the bottle surrounding the mouth of the bottle. Next, fluid-flow communication is provided 2104 between an interior air cavity of the device and a headspace of the bottle through the bottom opening. Then, a corkscrew is extended 2106 within the device toward the bottom opening of the bottle-receiving end to secure to a stopper within a neck of the bottle. Next, the corkscrew is retracted 2108 to remove the stopper from the neck of the bottle. Then, the stopper is stored 2110 within the interior air cavity of the device. Next, air is evacuated 2112 out from the interior air cavity of the device and the headspace of the bottle to create a vacuum or partial vacuum within the headspace. Then, the corkscrew is extended 2114 with the stopper secured thereto toward the mouth of the bottle and inserting the stopper into the neck of the bottle while the headspace of the bottle is under vacuum or partial vacuum.

The devices 100, 1000 described herein are not limited to use with wine or bottle storing wine but may be used to preserve any fluid or substance (e.g., herbs, powders, coffee, spirits, juices, chemicals, etc.) under vacuum in a container. The devices 100, 1000 may also be modified in size to function similarly with bottles, jars, or containers of various sizes and shapes.

Moreover, the devices 100, 1000 described herein allow a bottle 10 to be resealed under vacuum using the same stopper 105 it had before. No special, device-specific stoppers that are specifically adapted for use with the device 1000 are needed to reseal the bottle 10. This greatly reduces the cost and complexity of the device 1000 and also allows a user to reseal countless bottles without being limited to a specific number of device-specific stoppers available on hand. According to one aspect, the devices 100, 1000 may also be used to reseal the bottle using a stopper belonging to another bottle so long as the stopper has a size and shape corresponding to the bottle's neck.

One or more of the components, steps, features, and/or functions illustrated in FIGS. 1, 2, 3, 4, 5, 6, 7, 8, 9, 10, 11, 12, 13, 14, 15, 16, 17, 18, 19, 20, and/or 21 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, 5, 6, 7, 8, 9, 10, 11, 12, 13, 14, 15, 16, 17, 18, 19, and/or 20 may be configured to perform one or more of the methods, features, or steps described in FIG. 21. Some of the algorithms described herein may also be efficiently implemented in software and/or embedded in hardware.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different ways without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus comprising:
a main body having a bottle-receiving end that is adapted to receive a bottle and form a substantially airtight seal between the main body and an exterior surface of the bottle surrounding a mouth of the bottle, the bottle-receiving end having a bottom opening to allow for fluid-flow communication between an interior air cavity of the main body and a headspace of the bottle;
a stopper securement device;
a vacuum pump adapted to evacuate air out of the interior air cavity and the headspace to create a vacuum or partial vacuum within the headspace;
means for removing an original stopper of the bottle from a neck of the bottle using the stopper securement device, wherein the original stopper of the bottle is a cork; and
means for inserting the original stopper of the bottle back into the mouth of the bottle using the stopper securement device after the vacuum pump evacuates air out of the interior cavity and the headspace, thereby sealing the bottle with the headspace of the bottle under vacuum or partial vacuum.

2. The apparatus of claim 1, wherein:
the means for removing the original stopper of the bottle is adapted to remove the original stopper of the bottle prior to the vacuum pump evacuating air out of the interior air cavity and the headspace.

3. The apparatus of claim 2, wherein the means for inserting the original stopper of the bottle into the mouth of the bottle and the means for removing the original stopper of the bottle from the neck of the bottle is an actuator assembly that includes an electric motor powered by a battery.

4. The apparatus of claim 1, wherein the bottle-receiving end includes an elastic bottom surface adapted to form a substantially airtight seal between the main body and the exterior surface of the bottle surrounding the mouth of the bottle.

5. The apparatus of claim 1, wherein the bottle-receiving end includes a foam ring adapted to form a substantially airtight seal between the main body and the exterior surface of the bottle surrounding the mouth of the bottle.

6. The apparatus of claim 1, wherein the vacuum pump includes an inlet within the interior air cavity of the main body to evacuate air from the interior air cavity and an outlet at or near an exterior service of the main body to eject the air evacuated outside the apparatus.

7. The apparatus of claim 1, wherein the main body includes:
an upper portion; and
a lower portion, wherein the upper portion and lower portion have different diameters and are slideably coupled to each other allowing one to retract into the other, the lower portion including the bottle-receiving end having the bottom opening.

8. The apparatus of claim 7, wherein the upper portion and the lower portion are adapted to move relative to each other so that the upper portion lowers the original stopper of the bottle down into the mouth of the bottle after the vacuum pump evacuates air out of the interior cavity and the headspace.

9. The apparatus of claim 8, further comprising:
a locking mechanism coupled to the main body, the locking mechanism adapted to prevent the upper portion and the lower portion from moving with respect to each other when engaged.

10. An apparatus comprising:
a housing having a bottle-receiving end that is adapted to receive a bottle and form a substantially airtight seal between the housing and an exterior surface of the bottle surrounding a mouth of the bottle, the bottle-receiving end having a bottom opening to allow for fluid-flow communication between an interior air cavity of the housing and a headspace of the bottle;
an actuator assembly operatively coupled to a stopper securement device, the actuator assembly adapted to move the stopper securement device to secure an original stopper of the bottle and remove the original stopper of the bottle from the mouth of the bottle, wherein the original stopper of the bottle is a cork; and
a vacuum pump adapted to evacuate air out of the interior air cavity and the headspace after the original stopper of the bottle has been removed to create a vacuum or partial vacuum within the headspace, wherein the actuator assembly is further adapted to move the stopper securement device and the original stopper of the bottle secured thereto in order to insert the original stopper of the bottle back into the mouth of the bottle.

11. The apparatus of claim 10, wherein the actuator assembly is further adapted to:
extend the stopper securement device toward the bottom opening and into the original stopper of the bottle while rotating the stopper securement device.

12. The apparatus of claim 10, wherein the actuator assembly is further adapted to:
retract the stopper securement device with the original stopper of the bottle secured thereto without rotating the stopper securement device.

13. The apparatus of claim 10, wherein the actuator assembly is further adapted to:
extend the stopper securement device with the original stopper of the bottle secured thereto toward the bottom opening; and
press the original stopper of the bottle into the mouth of the bottle while rotating the stopper securement device.

14. The apparatus of claim 10, wherein the bottle-receiving end includes an elastic bottom surface adapted to form a substantially airtight seal between the housing and the exterior surface of the bottle surrounding the mouth of the bottle.

15. The apparatus of claim 10, wherein the bottle-receiving end includes a foam ring adapted to form a substantially airtight seal between the housing and the exterior surface of the bottle surrounding the mouth of the bottle.

16. The apparatus of claim 10, further comprising:
an air pressure sensor that determines whether the air pressure within the headspace has achieved or exceed a predetermined level of vacuum prior to the actuator assembly inserting the original stopper of the bottle into the mouth of the bottle.

17. The apparatus of claim 10, wherein the vacuum pump is an electronic, battery-operated positive-displacement vacuum pump, and the actuator assembly includes a direct current (DC) electric motor that drives the stopper securement device.

18. The apparatus of claim 10, wherein the housing is substantially cylindrical in shape and the apparatus if a handheld, battery-operated device.

19. A method comprising:
inserting a mouth of a bottle into a bottom opening of a bottle-receiving end of a device to form a substantially airtight seal between the bottle-receiving end of the device and an exterior surface of the bottle surrounding the mouth of the bottle;
providing fluid-flow communication between an interior air cavity of the device and a headspace of the bottle through the bottom opening;
extending a corkscrew within the device toward the bottom opening of the bottle-receiving end to secure to a stopper within a neck of the bottle;
retracting the corkscrew to remove the stopper from the neck of the bottle;
storing the stopper within the interior air cavity of the device;
evacuating air out from the interior air cavity of the device and the headspace of the bottle to create a vacuum or partial vacuum within the headspace; and
extending the corkscrew with the stopper secured thereto toward the mouth of the bottle and inserting the stopper into the neck of the bottle while the headspace of the bottle is under vacuum or partial vacuum.

20. The method of claim 19, wherein the stopper is an original cork of the bottle.

* * * * *